W. P. RECKARD.
SINTERING APPARATUS.
APPLICATION FILED APR. 3, 1918.
1,308,864.
Patented July 8, 1919.
3 SHEETS—SHEET 1.
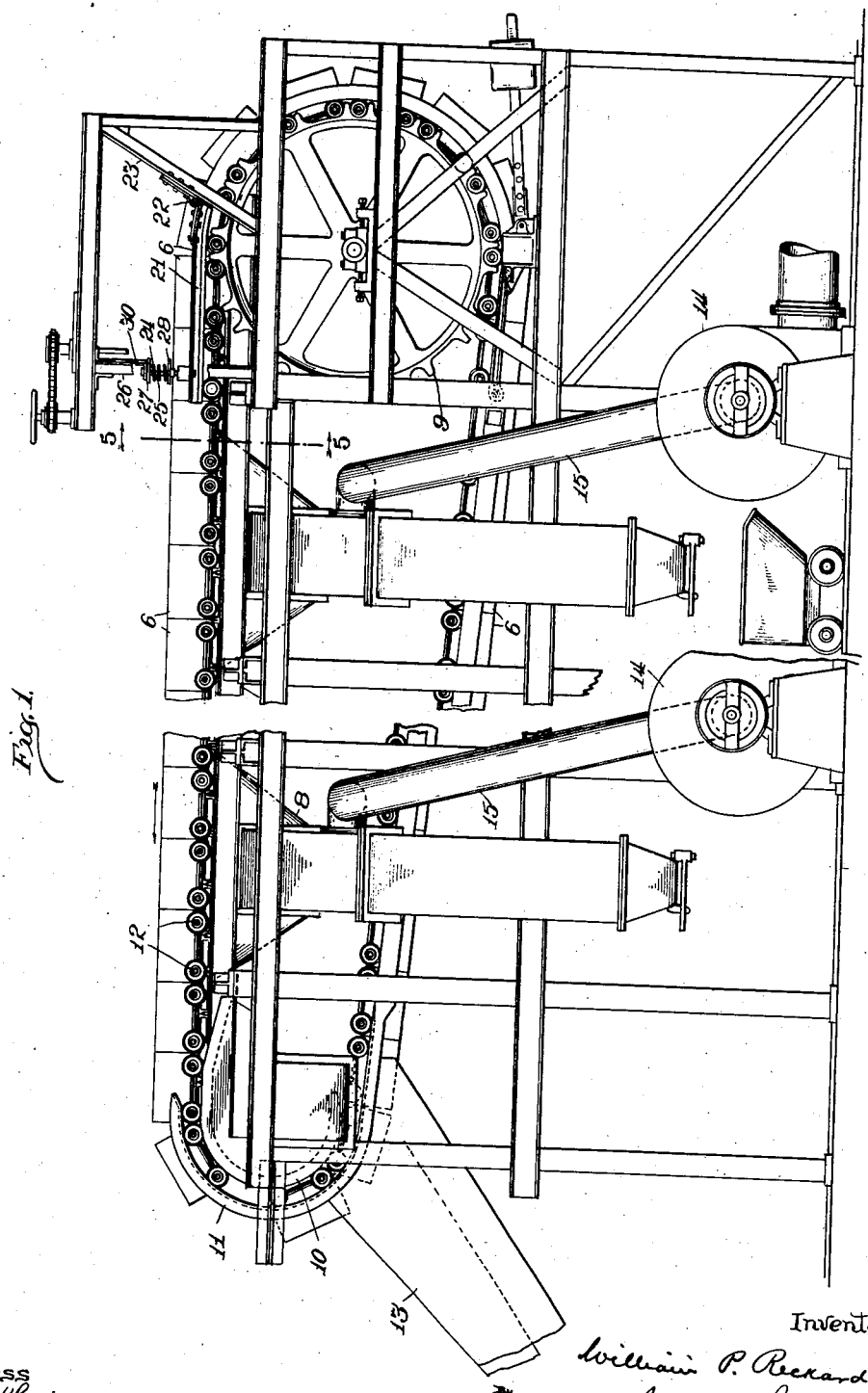

W. P. RECKARD.
SINTERING APPARATUS.
APPLICATION FILED APR. 3, 1918.
1,308,864.
Patented July 8, 1919.
3 SHEETS—SHEET 2.
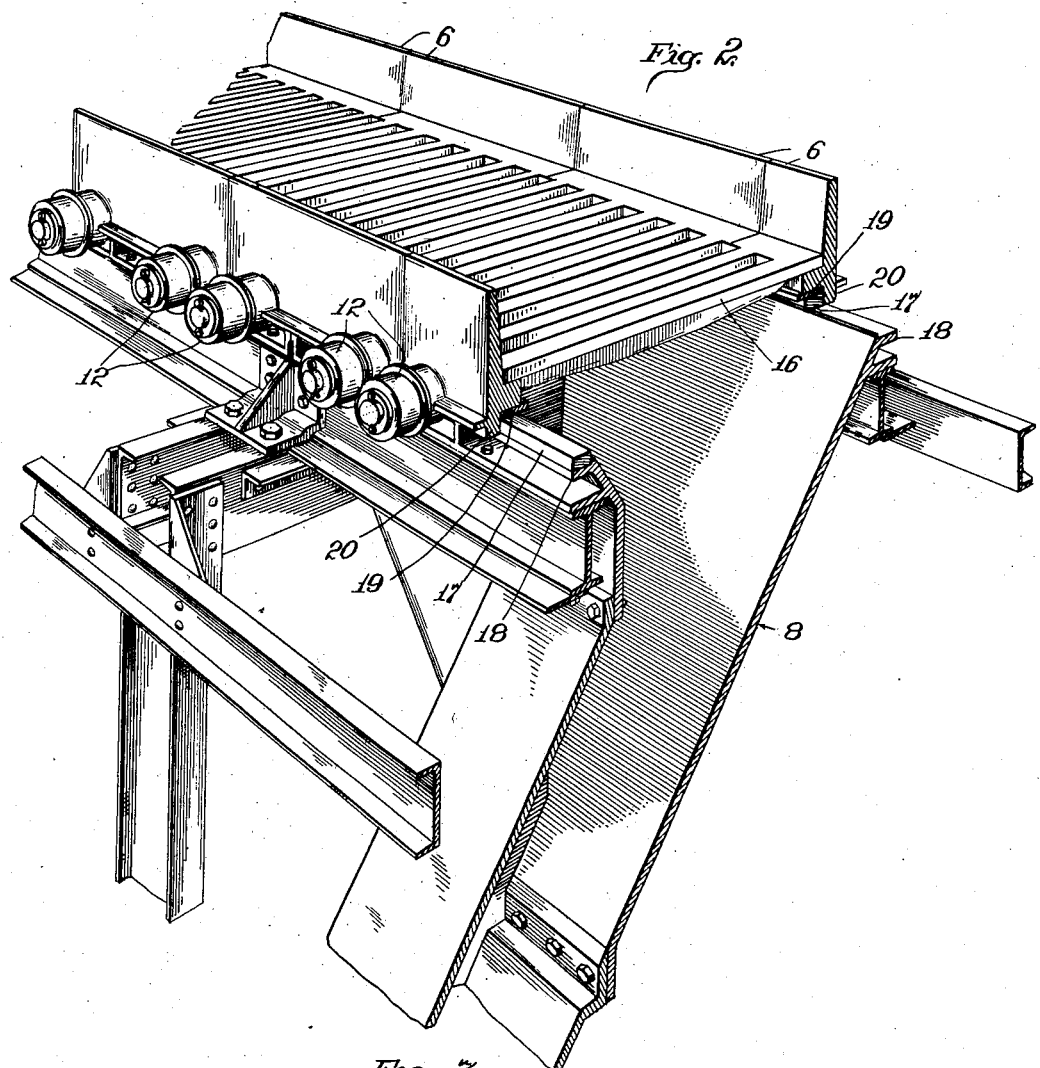
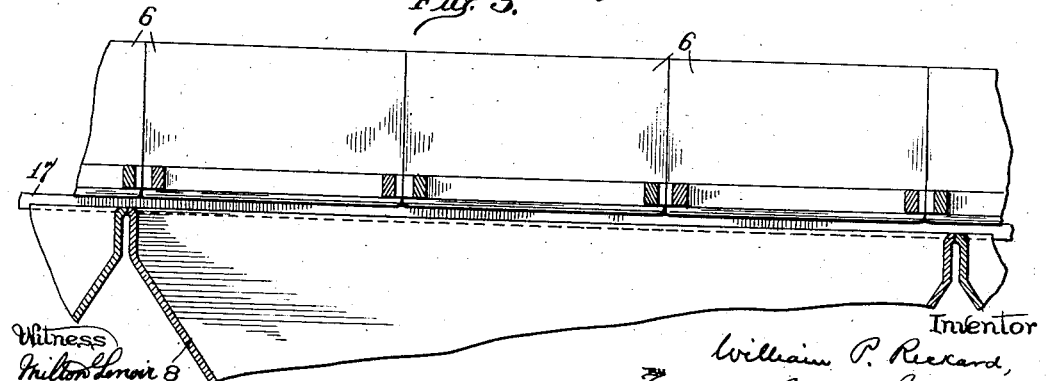

W. P. RECKARD.
SINTERING APPARATUS.
APPLICATION FILED APR. 3, 1918.

1,308,864.

Patented July 8, 1919.

Witness
Milton Lenoir

Inventor
William P. Reckard,
By Adams & Jackson,
Attorneys

UNITED STATES PATENT OFFICE.

WILLIAM P. RECKARD, OF YOUNGSTOWN, OHIO, ASSIGNOR TO AMERICAN SINTERING COMPANY, OF CHICAGO, ILLINOIS, A CORPORATION OF ILLINOIS.

SINTERING APPARATUS.

1,308,864. Specification of Letters Patent. Patented July 8, 1919.

Application filed April 3, 1918. Serial No. 226,362.

*To all whom it may concern:*

Be it known that I, WILLIAM P. RECKARD, a citizen of the United States, and a resident of Youngstown, in the county of Mahoning and State of Ohio, have invented certain new and useful Improvements in Sintering Apparatus, of which the following is a specification, reference being to the accompanying drawings.

My invention relates to apparatus for sintering ores of the type in which the ores to be treated are moved over one or more wind boxes by means of a traveling endless conveyer composed of a series of consecutively abutting pallets held together in the form of a train by any suitable mechanism, the beds of said pallets being in the form of grates so that as the pallets pass over the wind boxes suction applied to the wind boxes will cause a down draft through the ore, which, having been ignited at the surface, is thereby roasted or sintered. Obviously in an apparatus of this character, it is necessary that the several pallets shall be so constructed and related to each other and to the wind box as to form a comparatively tight seal against the passage of air except through the grates in order that the suction devices may operate efficiently in maintaining the requisite down draft through the ore. The fact that at any given time a number of consecutive pallets are simultaneously in operative relation to a particular wind box, and that the pallets before reaching the first wind box are moved out of longitudinal alinement with each other by the passage of the conveyer around the sprocket wheels by which it is driven and frequently do not become properly re-alined so as to fit together closely enough to prevent abnormal leakage of air between consecutive pallets, has made it necessary to provide means for insuring proper alinement of the pallets before they pass over the wind box, but, while various expedients have heretofore been proposed for this purpose, so far as I am aware prior to my present invention hereinafter described the problem has not been satisfactorily solved.

In the accompanying drawings in which I have illustrated my invention in connection with the principal parts of a sintering apparatus of the type referred to,—

Figure 1 is a side elevation, certain parts being broken away;

Fig. 2 is an enlarged perspective view showing part of a wind box and several of the conveyer pallets;

Fig. 3 is a partial longitudinal vertical section through a series of pallets, the grates thereof being omitted, showing also the upper portions of the wind boxes;

Figure 4:
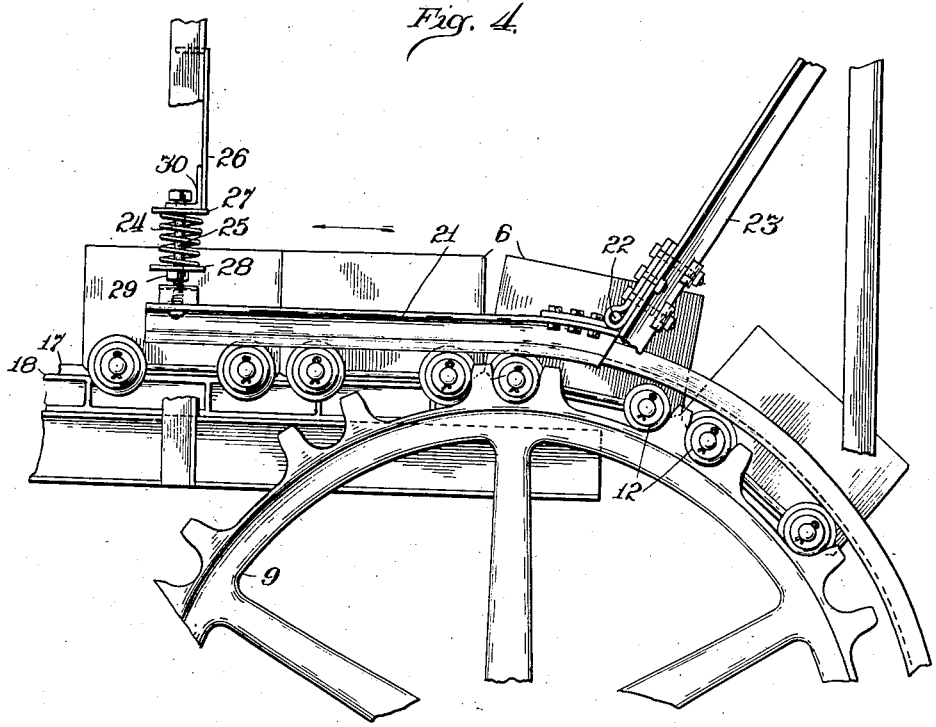
Fig. 4 is a partial side elevation illustrating my improvements more in detail.
Figure 5:
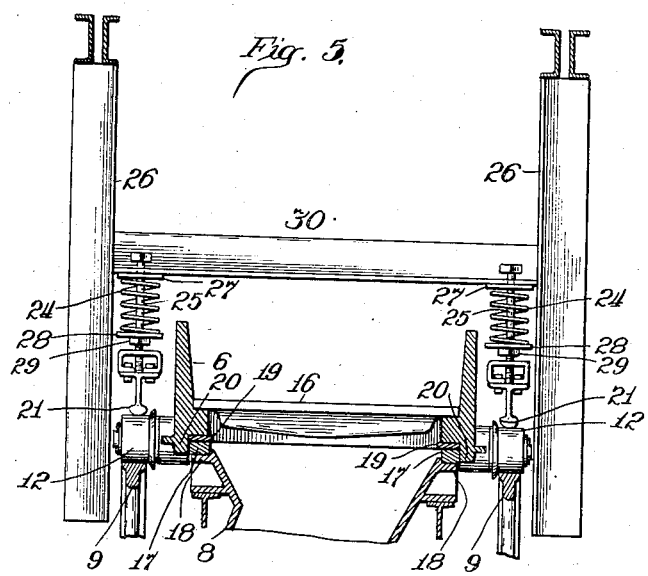
Fig. 5 is a partial vertical cross-section substantially on line 5—5 of Fig. 1.

The details of the construction of the sintering apparatus as a whole need not be described at length as they are well understood by those familiar with the art, and for the purpose of this specification it will suffice to point out that the apparatus comprises an endless conveyer made up of a series of consecutively abutting pallets 6 held together in the form of an endless train by suitably arranged supporting rails or guides and caused to travel over one or more wind boxes 8 by means of a pair of sprocket wheels 9 driven in any suitable manner. The conveyer extends substantially horizontally from the sprocket wheels 9 to the opposite end of the machine where inner and outer guides 10—11 are provided, between which laterally projecting wheels 12 carried by the pallets pass down, so that the pallets are carried down and around to the usual discharge chute 13. The pallets supported by the outer guides 11, then pass back to the under side of the sprocket wheels 9 by which they are again carried up and with a fresh load are again moved over the wind boxes. As best shown in Figs. 4 and 5, each of the pallets is provided with two pairs of wheels 12 placed at opposite sides thereof near its ends, and the teeth of the sprocket wheels 9 are arranged to engage said wheels and through them drive the conveyer. 14 indicates exhaust fans connected by pipes 15 with the wind boxes 8 for causing a down draft through the pallets in the usual way. 16 indicates the grates one of which forms the bottom or bed of each pallet. The framework of the apparatus may be of any construction suitable for the purpose and need not be particularly described.

The construction as thus far explained is old and separately considered no claim is made thereto.

By reference to Fig. 4, it will be noted that as the pallets, moving in the direction indicated by the arrow in said figure, are carried up by the sprocket wheel 9 they turn at an angle to each other and consequently gaps are formed between successive pallets which if not closed by the proper re-alinement of the pallets before they pass over the first wind box will permit excessive leakage between the pallets and consequently seriously interfere with the maintenance of the proper down draft through the ore. It is also necessary to move the pallets into longitudinal alinement with each other in order to maintain a proper contact between the lower longitudinal margins of the pallet and the upper longitudinal margins of the wind box, and my invention has to do particularly with the mechanism by which this is accomplished.

Referring to Figs. 2 and 5, 17 indicates wearing plates or strips, of steel or other suitable material, which rest upon the upper longitudinal margins 18 of the wind boxes and are suitably secured in position. 19 indicates co-acting wearing plates or strips which are secured to the under side portions of the pallets and bear upon the wearing strips 17. 20 indicates flanges which depend below the side plates of the pallets and bear against the outer margins of the wearing strips 17, thereby preventing lateral displacement of the pallets and also helping to prevent leakage. The arrangement is such that when the pallet grates are alined longitudinally the wearing strips 19 will bear closely upon the wearing strips 17, as best shown in Fig. 5. 21 indicates rails which overlie the pallet wheels 12 between the upper portion of the sprocket wheels 9 and the first wind box, as shown in Fig. 4. These rails are pivotally mounted at 22 adjacent to the highest portions of the sprocket wheel 9, being supported by a suitable frame 23, and extend from their pivotal points over the wheels 12 to any suitable distance to the left, as shown in said figure, where they are resiliently supported by springs 24 and bolts 25. Said bolts are supported by brackets 26, the springs 24 being mounted between plates 27—28 mounted on said bolts as shown. Thus the rails 21 are self-supporting as the springs tend to press the free ends of said rails down upon the wheels 12 and consequently positively move the wearing plates 19 down into engagement with the wearing strips 17 soon after the pallets leave the sprocket wheels 9, at the same time causing the several pallets to move into proper alinement with each other, thereby insuring the maintenance of the desired wind seal. The bolts 25 are provided with adjustable nuts 29 by which the tension of the springs 24 may be regulated to vary the pressure of the wearing plates 19 upon the strips 17. Preferably the brackets 26 at the opposite sides of the machine are connected by a cross-bar 30, which may be an angle strip, as shown in Figs. 4 and 5, thereby holding the rails 21 firmly against lateral displacement.

While I have shown the rails 21 as extending from the sprocket wheels only to the near edge of the first wind box, it will be understood that the length of such rails may be varied, and they may also be applied at other points where it may be desired to apply downward pressure to the pallets, although ordinarily the only place where they are needed is at the point where the line of travel of the conveyer when approaching a wind box has been deflected from a straight path. I wish it to be understood also that my invention is not limited to the specific embodiment thereof illustrated and described as it includes such modifications or variations as will occur to those skilled in the art.

What I claim as my invention and desire to secure by Letters Patent, is:—

1. In a sintering machine of the type described, the combination with a conveyer comprising a series of pallets, a wind box over which said pallets travel, said pallets and wind box having bearing surfaces adapted to co-act to form a wind seal, and mechanism operating to press said bearing surfaces into close contact with each other.

2. In a sintering machine of the type described, the combination with a conveyer comprising a series of pallets, a wind box over which said pallets travel, said pallets and wind box having bearing surfaces adapted to co-act to form a wind seal, and resilient means for bringing said bearing surfaces into close contact with each other.

3. In a sintering machine of the type described, the combination with a conveyer comprising a series of pallets, a wind box over which said pallets travel, said pallets and wind box having bearing surfaces adapted to co-act to form a wind seal, and means for applying downward pressure to the pallets to bring said bearing surfaces into close contact with each other.

4. In a sintering machine of the type described, the combination with a conveyer comprising a series of pallets, a wind box over which said conveyer travels, co-acting bearing members between the side marginal portions of said pallets and said wind box, and mechanism operating to press said bearing members into close contact with each other.

5. In a sintering machine of the type described, the combination with a conveyer comprising a series of pallets, a wind box over which said conveyer travels, co-acting bearing members between the side marginal portions of said pallets and said wind box, and means for applying downward pressure to the pallets to bring said bearing members into close contact with each other.

6. In a sintering machine of the type described, the combination with a conveyer comprising a series of pallets, a wind box over which said conveyer travels, said pallets and wind box having bearing surfaces adapted to co-act to form a wind seal, a driving wheel over which said pallets pass to said wind box, and means for positively moving said pallets into alinement with each other before they pass over the wind box.

7. In a sintering machine of the type described, the combination with a conveyer comprising a series of pallets, a wind box over which said conveyer travels, said pallets and wind box having bearing surfaces adapted to co-act to form a wind seal, a driving wheel over which said pallets pass to said wind box, and means between said driving wheel and said wind box for positively moving said pallets into alinement with each other.

8. In a sintering machine of the type described, the combination with a conveyer comprising a series of pallets, a wind box over which said conveyer travels, said pallets and wind box having bearing surfaces adapted to co-act to form a wind seal, a driving wheel over which said pallets pass to said wind box, and resilient means between said driving wheel and said wind box for positively moving said pallets into alinement with each other.

9. In a sintering machine of the type described, the combination with a conveyer comprising a series of pallets and laterally projecting wheels carried by said pallets, a wind box over which said conveyer travels, said pallets and wind box having bearing surfaces adapted to co-act to form a wind seal, and movable means adapted to engage the upper surfaces of said wheels to bring said pallets into longitudinal alinement before they pass over the wind box.

10. In a sintering machine of the type described, the combination with a conveyer comprising a series of pallets and laterally projecting wheels carried by said pallets, a wind box over which said conveyer travels, said pallets and wind box having bearing surfaces adapted to co-act to form a wind seal, and longitudinally-extending rails adapted to yieldingly engage the upper surfaces of said wheels to bring said pallets into longitudinal alinement before they pass over the wind box.

11. In a sintering machine of the type described, the combination with a conveyer comprising a series of pallets, a wind box over which said conveyer travels, said pallets and wind box having bearing surfaces adapted to co-act to form a wind seal, a driving wheel over which said pallets pass to said wind box, and rails extending longitudinally between said driving wheel and said wind box for moving said pallets downward to bring said bearing surfaces into close contact with each other.

12. In a sintering machine of the type described, the combination with a conveyer comprising a series of pallets, a wind box over which said conveyer travels, said pallets and wind box having bearing surfaces adapted to co-act to form a wind seal, a driving wheel over which said pallets pass to said wind box, and rails extending longitudinally between said driving wheel and said wind box for moving said pallets downward to bring said bearing surfaces into close contact with each other, said rails being pivotally supported adjacent to the driving wheel, the opposite end portions of said rails being vertically movable.

13. In a sintering machine of the type described, the combination with a conveyer comprising a series of pallets, a wind box over which said conveyer travels, said pallets and wind box having bearing surfaces adapted to co-act to form a wind seal, a driving wheel over which said pallets pass to said wind box, rails extending longtiudinally between said driving wheel and said wind box for moving said pallets downward to bring said bearing surfaces into close contact with each other, said rails being pivotally supported adjacent to the driving wheel, and springs connected with the opposite end portions of said rails and arranged to apply yielding downward pressure to said pallets.

WILLIAM P. RECKARD.